United States Patent [19]
DeSantis

[11] Patent Number: 4,569,183
[45] Date of Patent: Feb. 11, 1986

[54] TRAY LOCATOR AND LOADER FOR CONVEYOR APPARATUS, AND METHOD

[75] Inventor: Raymond P. DeSantis, Troy, Mich.

[73] Assignee: PTX-Pentronix, Inc., Lincoln Park, Mich.

[21] Appl. No.: 479,279

[22] Filed: Mar. 28, 1983

Related U.S. Application Data

[63] Continuation-in-part of Ser. No. 465,166, Feb. 9, 1983.

[51] Int. Cl.⁴ .......................... B65B 5/08; B65B 5/10; B65G 47/52
[52] U.S. Cl. ........................................ 53/534; 53/246; 53/251; 198/468.3; 414/732; 414/752; 901/37
[58] Field of Search ................ 53/444, 472, 475, 148, 53/534, 539, 236, 246, 247, 251; 901/37, 40, 15; 414/752, 733, 737, 732; 198/409, 428, 430, 486

[56] References Cited

U.S. PATENT DOCUMENTS

| | | | |
|---|---|---|---|
| 2,976,659 | 3/1961 | Flanagan et al. | 53/251 X |
| 3,267,643 | 8/1966 | Dardaine | 53/246 |
| 3,550,789 | 12/1970 | Jaeger | 198/430 X |
| 3,677,419 | 7/1972 | Giffen | 198/486 X |
| 3,770,098 | 11/1973 | Baugnies et al. | 414/732 X |
| 3,920,128 | 11/1975 | Baker | 53/539 X |
| 3,971,190 | 7/1976 | McGill | 53/539 X |
| 4,441,852 | 4/1984 | Dixon | 414/733 |

Primary Examiner—Francis S. Husar
Assistant Examiner—Steven B. Katz
Attorney, Agent, or Firm—Hauke & Patalidis

[57] ABSTRACT

An apparatus for transferring elongated parts travelling on a first conveyor to a receptacle travelling on a second conveyor, the parts being placed singly in consecutive rows in the receptacle in a substantially vertical position. The apparatus comprises a part pick-up unit having a part pick-up member mounted on a slide. The part pick-up unit is positioned such as to enable the part pick-up member to pick up a part at the end of the first conveyor, and the part pick-up member, mounted on the output shaft of a rotary actuator, is rotated such as to rotate the part from a horizontal position to a vertical position during travel of the part pick-up unit and of the slide from the part pick-up position to the part-loading position. The part pick-up member has a pair of pivotable fingers for grasping the part or, in the alternative, the part pick-up member is in the form of a tubular member in which a portion of the part is introduced, and suction applied to the interior of the tubular member holds the part during transportation of the part from the pick-up position to the loading position.

16 Claims, 22 Drawing Figures

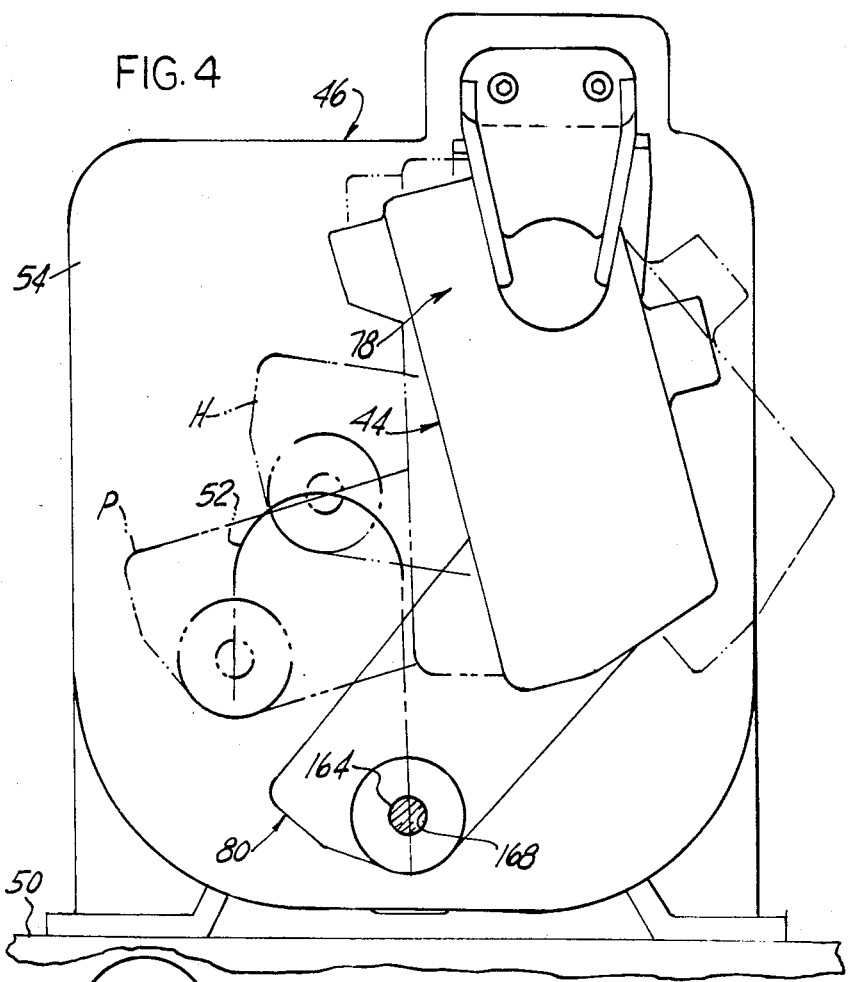
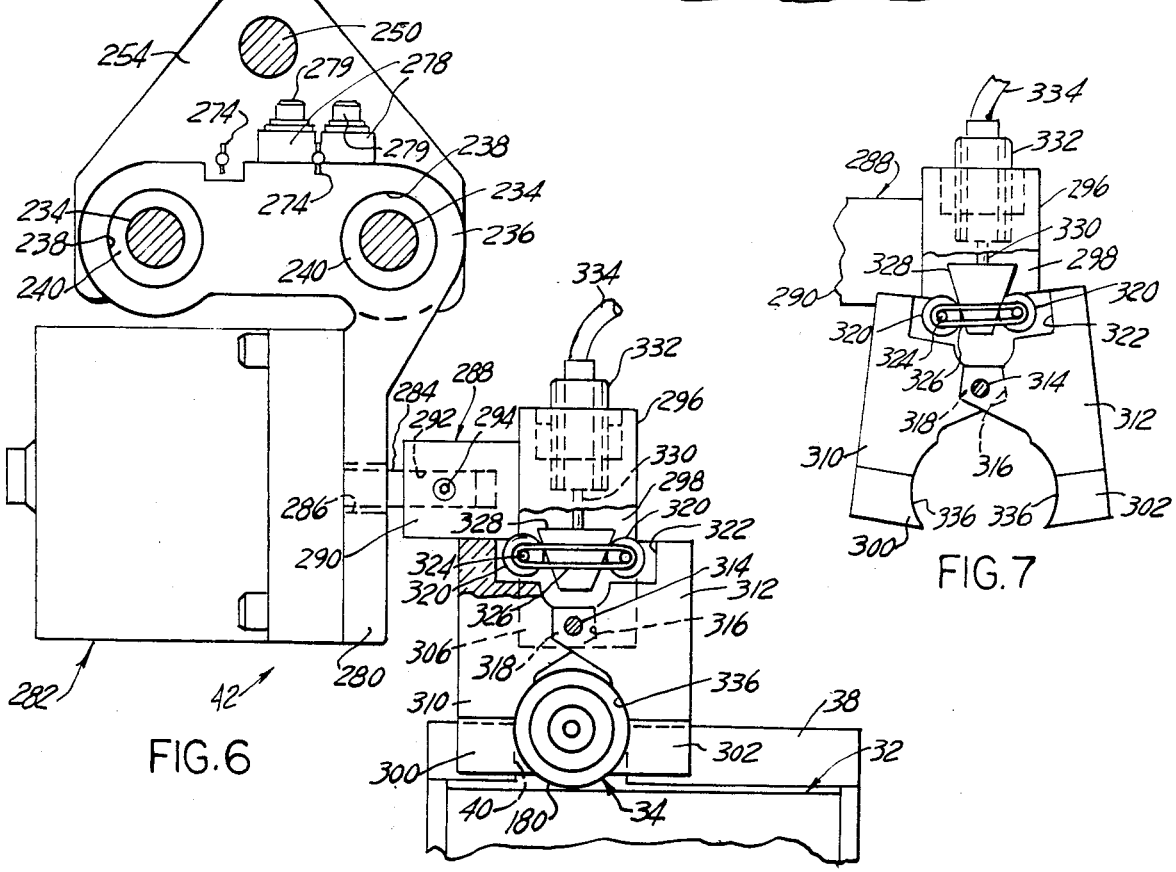

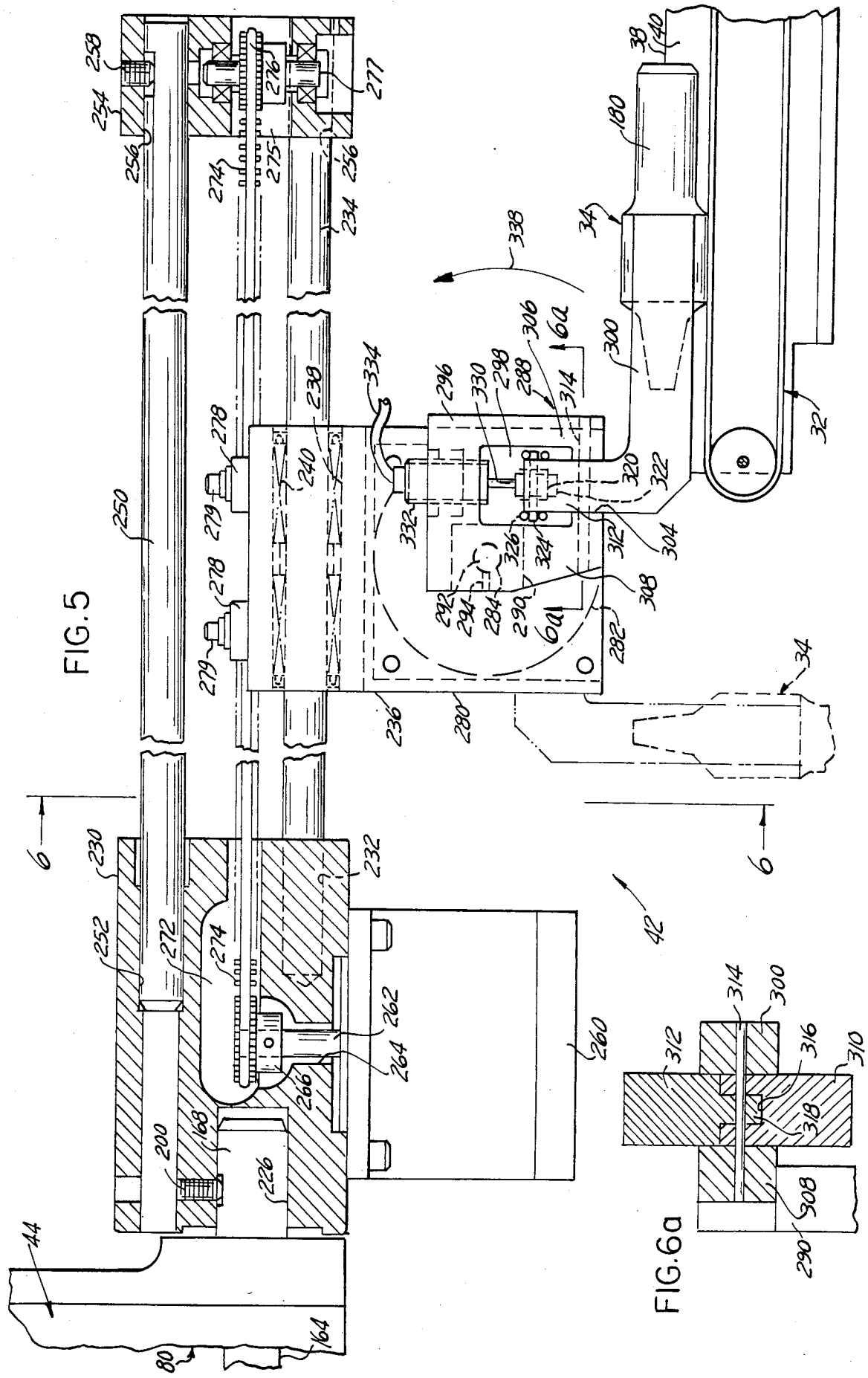

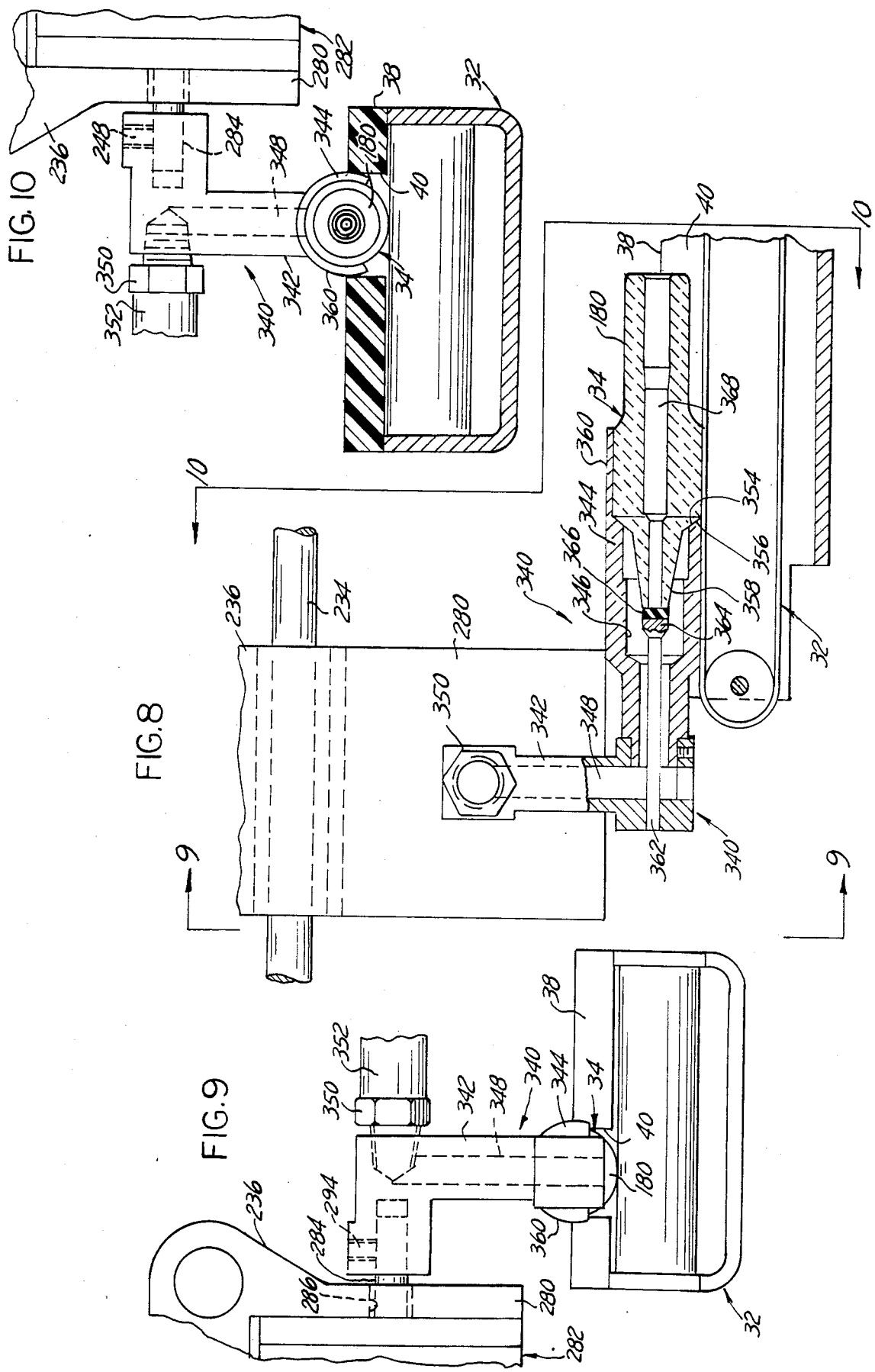

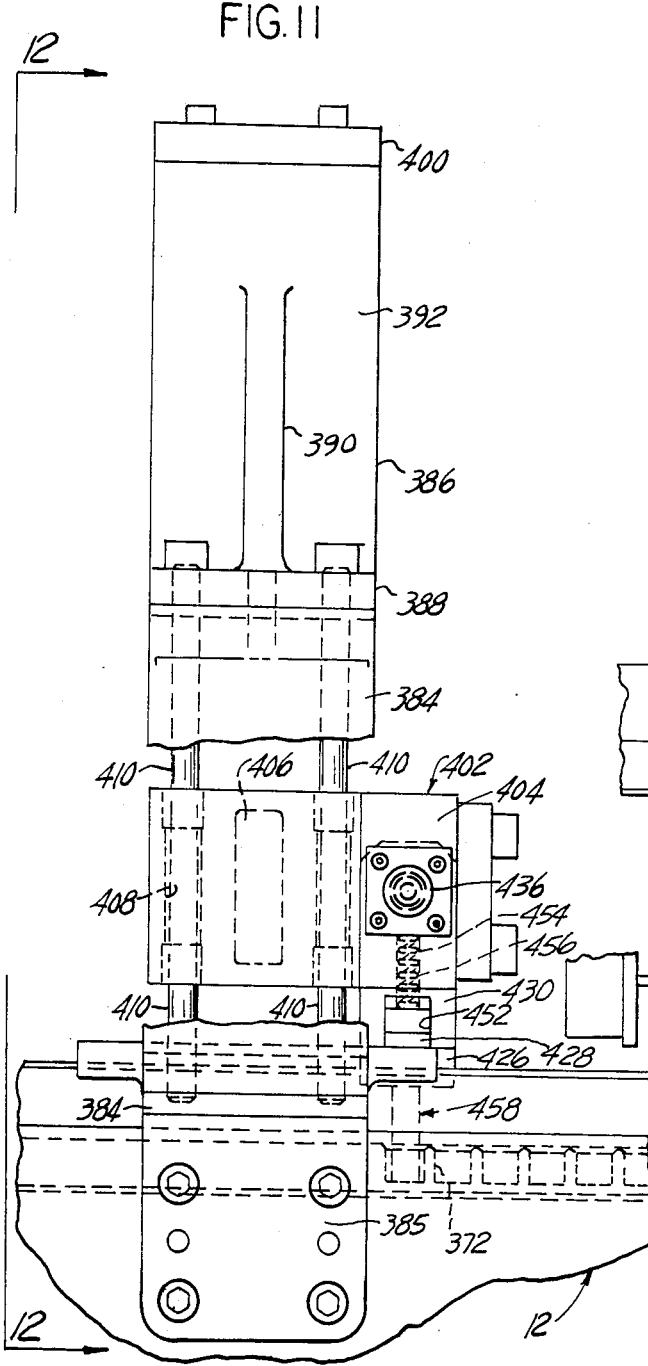
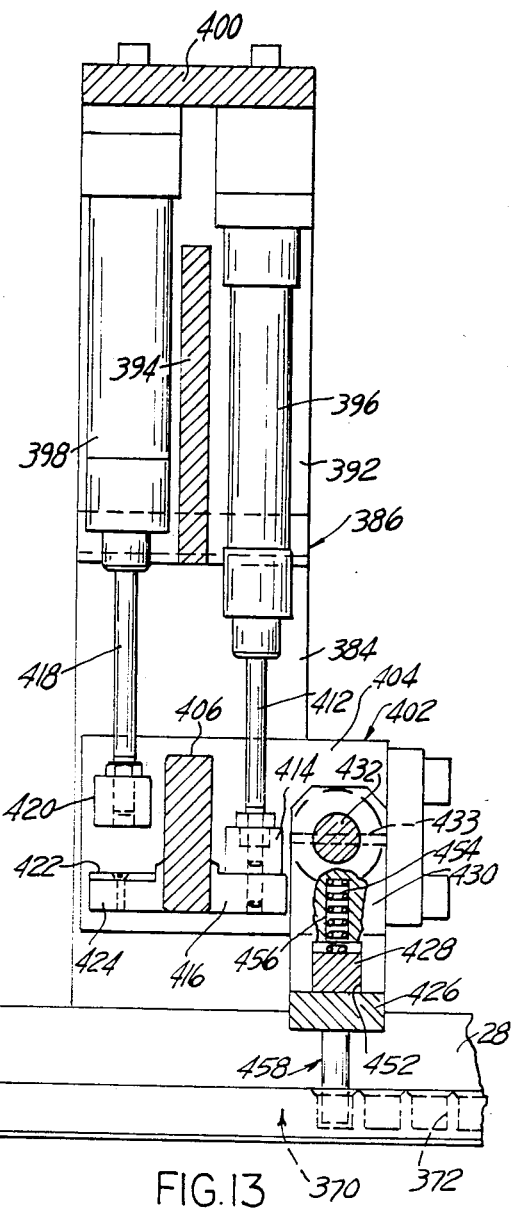

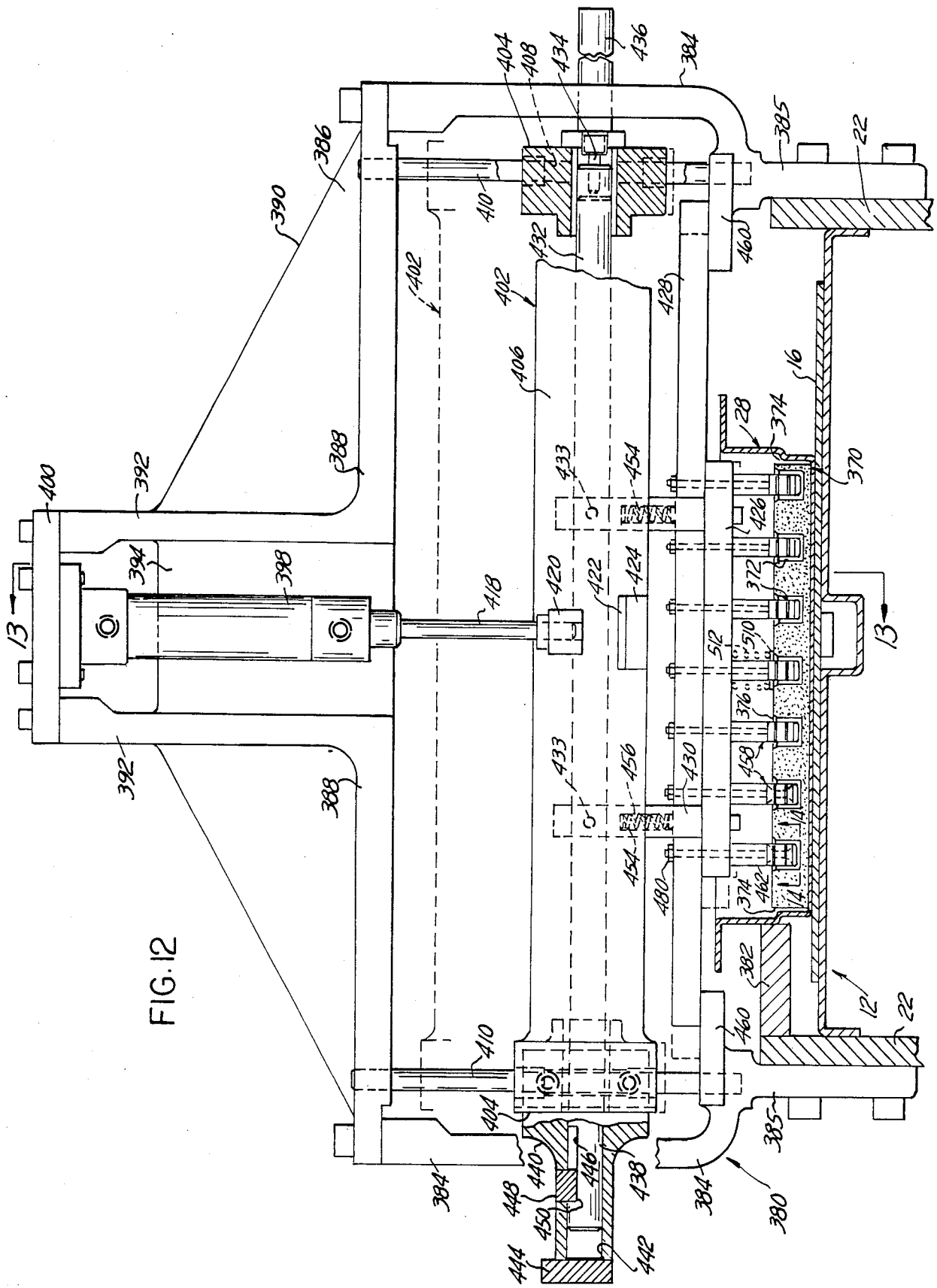

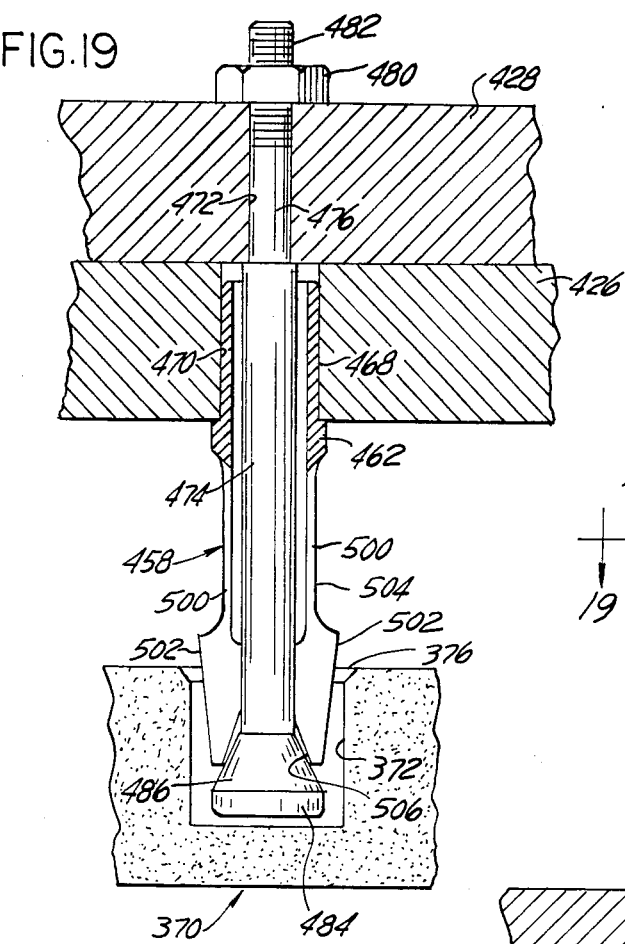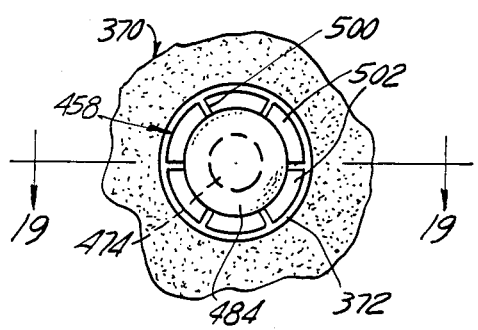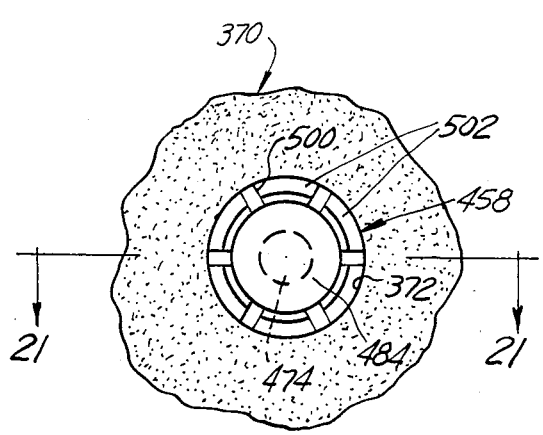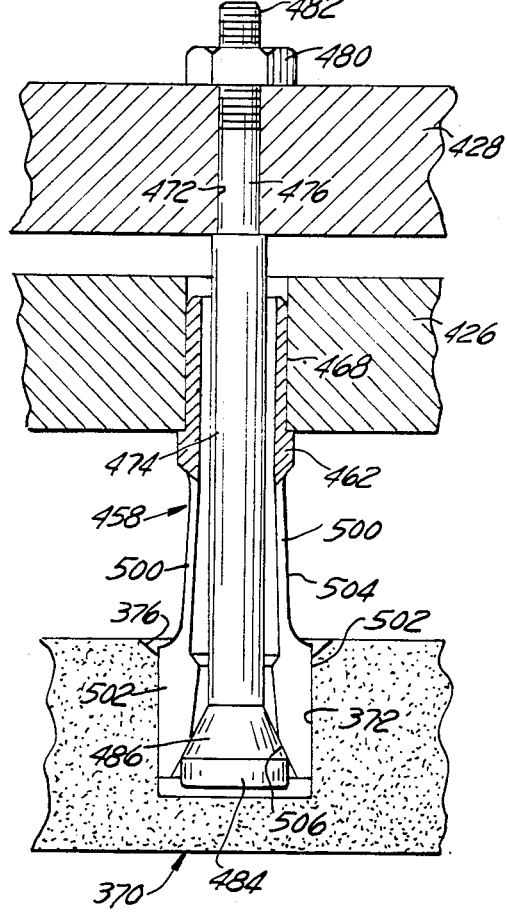

TRAY LOCATOR AND LOADER FOR CONVEYOR APPARATUS, AND METHOD

CROSS-REFERENCE TO RELATED APPLICATION

The present application is a continuation-in-part of application Ser. No. 465,166, filed Feb. 9, 1983 for Sagger Loader and Conveyor Apparatus and Method. The present application is a companion case of application Ser. No. 479,142 filed simultaneously herewith, and assigned to the same assignee as the present application.

BACKGROUND OF THE INVENTION

The present invention relates to a sagger loader and conveyor apparatus in general and more particularly to an apparatus and method for automatically conveying powder compacted articles or parts from a powder compacting press, or other apparatus, to saggers in which the parts are automatically loaded in a specific order, by rows for example, the saggers being on a moving conveyor belt.

Most articles and parts compacted of powder material in a powder compacting press are ultimately loaded in ceramic boats or saggers which are used for conveying the parts through a "firing" or sintering furnace. The parts, prior to sintering, are in a so-called "green" state wherein the particles of powder material are held in adhesion by a binder, and they are therefore relatively fragile.

Safe mechanical handling of such fragile parts presents many problems when the parts are transferred to a loading station, for example, where they are loaded in even rows in saggers and subsequently transported in the saggers to a sintering furnace. In view of the difficulties encountered in handling such fragile parts, manual sorting of the parts and manual loading of the saggers are often the solutions dictated by the necessity of avoiding damaging the parts when in their green and fragile state. The problem of appropriately loading saggers with fragile parts is further complicated by the fact that the parts must be placed in a regular order in the saggers, rather than in bulk at random, sometimes spaced apart in a row and the successive rows being also spaced apart, such as to allow the sintering operation to be effected under good conditions, with adequate air or inert gas circulation around the parts, without fusing the parts in a mass, and with even heating and cooling of the parts during travel through the sintering furnace and during any subsequent heat treatment operation, such as quenching for example.

SUMMARY OF THE INVENTION

The present invention provides a part conveyor and container loader particularly well adapted to handling fragile parts such as green compacted spark plug insulators being loaded in saggers. The present invention provides transfer of parts and more particularly cylindrical parts such as green spark plug insulators and the like from the ejection station of an apparatus to a sagger loading station where the parts are automatically transferred one at a time from a first conveyor to one of a plurality of saggers transported by a second conveyor, and accurately positioned in the sagger in a vertical position.

The many objects and advantages of the present invention will become apparent to those skilled in the art when the following description of the best mode contemplated for practicing the invention is read in conjunction with the accompanying drawing wherein like reference numerals refer to like elements and in which:

BRIEF DESCRIPTION OF THE DRAWING

FIG. 4 is a partial elevation view of a portion thereof from line 4—4 of FIG. 3;

FIG. 5 is an elevation view, partly in section from line 5—5 of FIG. 3, illustrating an example of structure for a part pick-up and loading mechanism;

FIG. 6 is a section thereof along line 6—6 of FIG. 5;

FIG. 6a is a partial section at line 6a—6a of FIG. 5;

FIG. 7 is a partial view similar to FIG. 6 but showing the part pick-up portion thereof in a part releasing state;

FIG. 8 is a partial sectional view illustrating a modification of the part pick-up structure of FIGS. 5-7.

FIG. 9 is a partial end view thereof from line 9—9 of FIG. 8;

FIG. 10 is a partial end view thereof from line 10—10 of FIG. 8;

FIG. 11 is a partial elevation view from line 11—11 of FIG. 3, illustrating more specifically an example of structure for locating and sizing part holding cavities in a tray in a sagger, with some portions broken away to show the internal structure;

FIG. 12 is a view thereof from line 12—12 of FIG. 11;

FIG. 13 is a sectional view substantially along line 13—13 of FIG. 12;

FIGS. 18-21 are views similar to FIGS. 14-17 but showing a modification of the cavity locator and sizing probe.

DETAILED DESCRIPTION OF THE PREFERRED EMBODIMENTS

Figure 1:
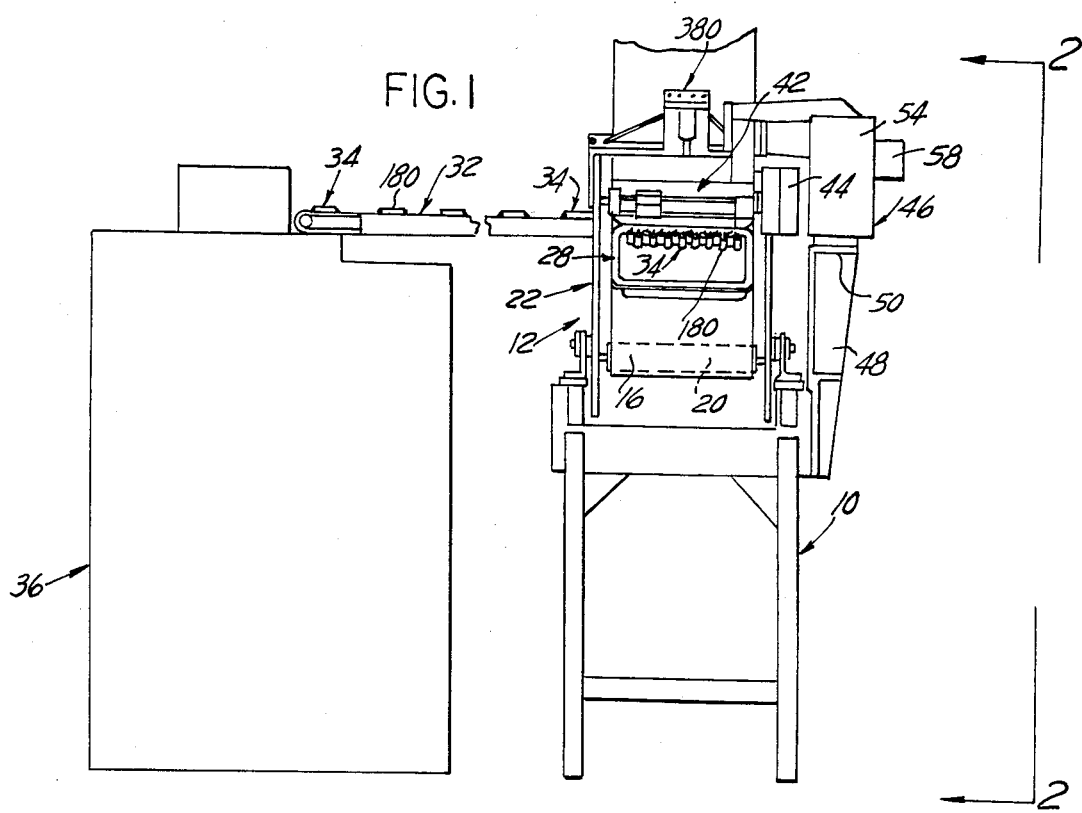
FIG. 1 is a front elevation view of a part sagger loader and conveyor apparatus according to the present invention.
Figure 2:
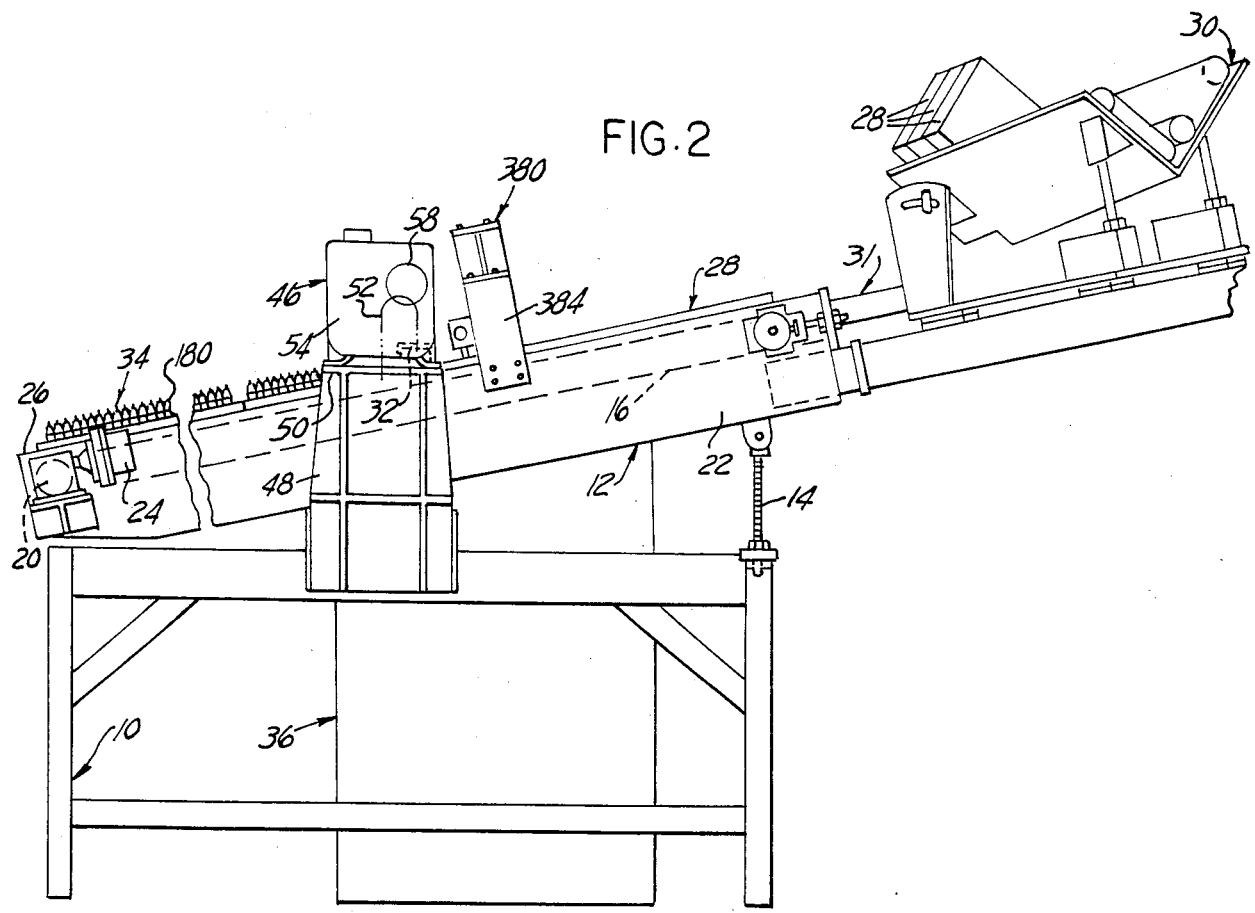
FIG. 2 is a side elevation view thereof from line 2—2 of FIG. 1.
Figure 3:
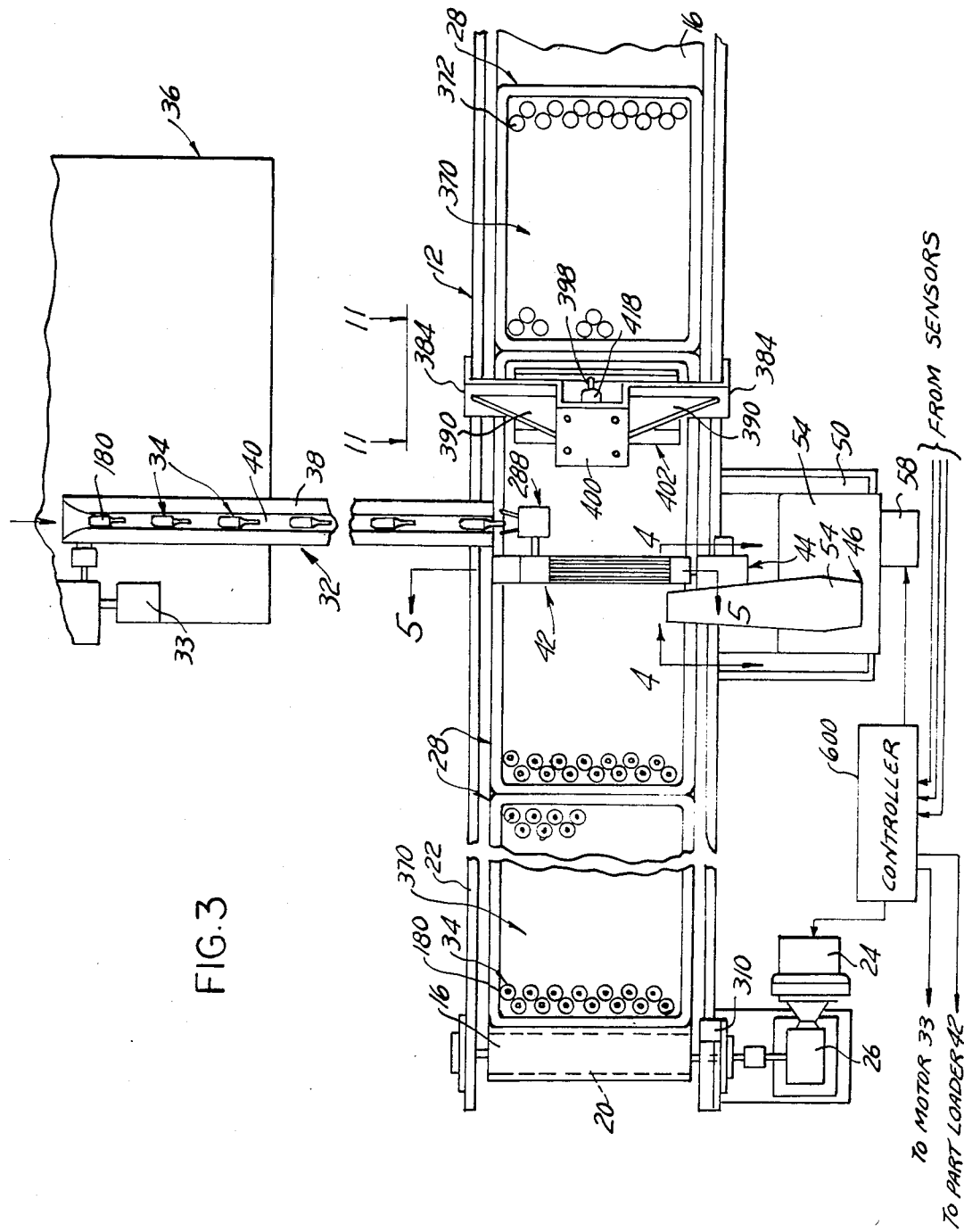
FIG. 3 is a top plan view thereof.

Referring to FIGS. 1-3, a part conveyor and sagger loading apparatus according to the present invention comprises a frame structure 10 supporting from the ground a sagger conveyor 12. The sagger conveyor 12 is disposed at an angle, and adjustable support pillars 14 are provided for adjustment of the angle of inclination of the sagger conveyor 12. The sagger conveyor 12 comprises an endless belt 16 supported by a free-wheeling drum, not shown, at one end and a power driven drum 20 at the other end, the drums being in turn rotatably supported by a frame 22, as is well known in the art. A stepping electrical motor 24, through a gear reduction drive 26, drives the power driven conveyor drum 20. Appropriate support rollers, or a support, not shown, may be disposed between the sides of the frame 22 below the conveyor belt 16 to provide additional support to the belt and to the load carried by the belt.

A plurality of ceramic boats or saggers 28 are stored in a sagger magazine 30, FIG. 2, from which they are transferred one at a time manually or by way of an appropriate automatic loading mechanism 31, forming no part of the present invention.

A part conveyor 32, driven by a geared-down stepping motor 33, is disposed substantially horizontally with its longitudinal axis at a right angle to the longitudinal axis of translation of the sagger conveyor 12. Although the part conveyor 32 may carry "green" powder compacted parts 34 from the part ejection station of a powder compacting press, the parts 34, in the example of application of the invention illustrated herein, are cylindrical elongated parts, such as spark plug green porcelain insulators, for example, which are ejected from a form grinder 36 adapted to form grind the peripheral shape of the insulator, preferably after compacting of the insulator bodies in an isostatic press or, alternatively, after extrusion through an extrusion die and cutting to length, as is well known in the art, and subsequent drying of the parts prior to form grinding.

The parts 34, after ejection from the form grinder 36, are disposed in a single row on the belt, not shown, of the conveyor 32. The belt of the part conveyor 32 is covered with a cover or shield 38, FIG. 3, having a slot 40 whose edges act as lateral guides for the row of parts 34. Upon reaching the end of the part conveyor 32, the parts 34 are taken, one at a time, by a pick-up unit 42 mounted on the end of the pivotable elbow-joint arm 44 of a loader 46. The loader 46 is mounted on a support plate 50 attached to the top of a bracket 48 affixed to the side of the conveyor support frame 10. The part pick-up unit 42, mounted on the end of the loader elbow-joint arm 44, engages a single part at a time, and is subsequently lifted by the elbow-joint arm 44 from above the part conveyor 32, displaced laterally along a curve, for example to the left as shown at FIG. 2, and moved vertically along a path arbitrarily represented at FIG. 2 by a phantom line 52 such as to place the part at an apropriate position in a sagger 28 travelling on the sagger conveyor 12. During placement of the part 34, the motion of the sagger conveyor belt 16 is stopped as a result of the stepping drive motor 24 having appropriately been momentarily turned off.

The loader 46, FIGS. 1–3, bolted on the support plate 50 on the top of the side bracket 48 has a housing 54 provided with a bolted down rear plate on which is mounted an electric stepping motor 58. The stepping motor 58 drives through an appropriate mechanism, not shown, but described in detail in co-pending application Ser. No. 465,166, the upper and lower arms 78 and 80 of the elbow-joint arm 44, FIG. 4.

The lower arm 80 supports at its lower end a stub shaft 164 having a projecting portion 168 on which is mounted the part pick-up unit 42, as shown at FIG. 5. The angular position of the stub shaft 164, and therefore of the part pick-up unit 42, remains spatially substantially constant throughout all the motions of the elbow-joint arm 44 from the home or rest position shown at H in phantom line, to the part pick-up position P also shown in phantom line, and to the sagger loading position shown in full line at FIG. 4. All throughout the motions of the elbow-joint arm 44, the support shaft 164 is prevented from actually rotating, as explained in detail in the aforesaid co-pending application.

The part pick-up unit 42 of FIGS. 5–7 is adapted to pick up one part 34 at a time from the part conveyor 32, FIGS. 1–3. The part 34 takes the form of an elongate, substantially cylindrical object such as, for example, a spark plug ceramic or porcelain insulator body 180 being picked up from a horizontal position on the part conveyor 32 and being placed vertically in an appropriate order in a row of parts 34 in the sagger 28 on the sagger conveyor 12.

The part pick-up unit 42 of FIGS. 5–7 comprises a support block 230 having a longitudinal bore 226 fitted over the end portion 168 of the support shaft 164 at the bottom of the lower arm 80 of the loader elbow-joint arm 44, by one or more setscrews 200 disposed radially. The block 230 is provided with a pair of parallel bores 232 in each of which is affixed the end of one of a pair of rods 234 acting as a support and ways for a slide 236. The slide 236 has a pair of parallel longitudinal bores 238 provided with linear bearings 240 permitting the slide 236 to be smoothly and linearly displaceable along the rods 234. A third rod 250 is fitted in third bore 252 in the support block 230, and extends longitudinally parallel to the pair of rods 234. A substantially triangular bracing end block 254, FIGS. 5 and 6, is provided with appropriate bores 256, in which are fitted the other ends of the rods 234 and 250 by means such as, for example, transverse setscrews 258, such as to provide a strong, sturdy and rigid assembly for supporting the slide 236.

A stepping motor 260 is bolted below the support block 230, its driveshaft 262 projecting within the block 230 through a bore 264. A cogwheel 266 is mounted on the end of the motor output shaft 262 in a cavity 272 formed in the support block 230. A chain 274 is wrapped around and driven by the motor output cogwheel 266. The chain 274 is also wrapped around a cogwheel 276 mounted on a free-wheeling shaft 277 disposed parallel to the motor output shaft 262 in a cutout portion 275 in the bracing end block 254. One end of the chain 274 is attached to the slide 236 by a clamp member 278, the other end of the chain being attached to the slide 236 by an adjustable clamp member 278. Each clamp member 278 takes any appropriate shape, and is longitudinally adjustable relative to the slide 236. Appropriate socket screws 279 are provided for locking the clamp member 278 in their adjusted chain-holding position. Alternatively, the chain 274 may be an endless chain attached at some point to the slide 236.

It can be seen that the stepping motor 260, through the chain 274, is capable of positioning the slide 236 to any appropriate intermediate positions between the support block 230 and the bracing end block 254.

A substantially vertical downwardly extending bracket 280 is fastened to or made integral with the bottom of the slide 236, proximate one side thereof. A rotary actuator 282 is mounted on one side of the bracket 280. The rotary actuator 282 may be a hydraulic rotary actuator, such as a Rotac actuator manufactured by Ex-Cell-O Corp., or an electric stepping motor. The rotary actuator 282 has an output shaft 284 projecting through a bore 286 in the bracket 280 to the other side of the bracket. A part pick-up head 288 is mounted on the end of the positioner shaft 284 by way of a mounting member 290 having a bore 292 through which is passed the end of the shaft 284, and appropriate radially disposed setscrews 294 fastening the mounting member 290 to the positioner shaft 284. The mounting member 290 is integrally formed with, or attached to, a block 296 having a substantially rectangular opening 298. A pair of substantially L-shaped fingers 300 and 302 are pivotally supported in a scissors-like fashion from the block 296, provided for that purpose with a cut-out portion 304 such as to define a pair of legs 306 and 308. Each finger 300 and 302 has a lever end portion, 310 and 312 respectively, projecting into the opening 298 through the cut-out portion 304. The lever end portions 310 and 312 are pivotable one relative to the other by way of a pivot pin 314 passed through aligned appropriate bores proximate the end of each of the block legs 306 and 308 and through appropriate bores in the lever arms 310 and 312. For the purpose of being mutually pivotable, one of the lever arms, lever arm 312 for example, FIG. 6a, is provided with a cut-out median portion 316 in which is disposed a corresponding lug 318 projecting from the lever arm 312.

A roller 320 is mounted in a recess 322, formed on the interior of the top portion of each of the lever arms 310-312, and is held by a pivot pin 324. Each pivot pin 324 has a projecting portion at each end forming an anchoring means for a garter coil spring or elastomeric ring 326 urging the end of the lever arms 310 and 312 towards each other and the rollers 320 in engagement with the sloping edge surface of a wedge member 328. The wedge member 328 is mounted on the end of a reciprocable linear actuator 330. The reciprocating linear actuator 330, in the structure illustrated, is the piston rod of an air cylinder 332 mounted on the top of the block 296 such that the piston rod-linear actuator 330 projects into the block opening 298. A flexible hose 334 connects the air cylinder 332 to a source of compressed air through an appropriate two-way valve, not shown. The air cylinder 332 may be replaced by an electrical solenoid. Downward displacement of the wedge member 328 mounted on the end of the linear actuator 330 spreads apart the lever arms 310 and 312 of the fingers 300 and 302 to the position illustrated at FIG. 6, for grabbing a part 34.

The fingers 300 and 302 have a generally cylindrical internal surface portion 336 conforming to the peripheral surface of a spark plug insulator body 180 for grasping a green spark plug insulator body conveyed by the part conveyor 32 when the spark plug insulator body reaches the end of the part conveyor 32, thus, for example, breaking a light beam activating a sensor in the form of a photocell which, in turn, controls the operation of the air cylinder 332 for retracting the wedge member 328. Subsequently, the rotary actuator 282 is activated, simultaneously with activating the stepping motor 260 displacing the slide 236 from the part pick-up position to a part-placing position depositing the spark plug insulator body 180 in a sagger 28 positioned on the sagger conveyor 12, FIGS. 1-3. During travel of the slide 236 from its part pick-up position to its part-placing position, the rotary actuator 282 rotates the part pick-up head 288, such as to rotate the part 34 preferably in the direction of the arrow 338 of FIG. 5 from its horizontal position to a vertical position, shown in phantom line at FIG. 5, around an arc of about 270°. Simultaneously therewith, the drive motor 58 of the loader 46 is activated such as to first raise the part pick-up unit 42 above the part conveyor 32 and displace the part pick-up unit 42 along the path 52 from the part pick-up position to the part-loading position of the part pick-up unit 42. The placement order, in a row in a sagger 28, of the spark plug insulator body 180, in the example of structure and operation herein described, is determined by the distance travelled by the slide 236 as driven by the stepping motor 260, control of the stepping motor 260 being effected by the number of electrical pulses applied to the motor according to an appropriate program.

The spark plug insulator body 180 is released as a result of opening the fingers 300-302, as shown at FIG. 7, by exhausting fluid from the cylinder 332, thus causing upward displacement of the wedge member 328 and opening of the fingers under the pulling action of the garter spring or elastomeric ring 326.

FIGS. 8-10 illustrate a suction, or vacuum, part pick-up head 340, adapted to pick up a part 34, such as a spark plug insulator body 180, from the part conveyor 32 for placement of the part 34 in a sagger 28 on the sagger conveyor 12. The part pick-up head 340 comprises an arm 342 mounted on the end of the output shaft 284 of the rotary actuator 282 mounted on one side of the bracket 280 of the slide 236. A tubular member 344 is mounted, at right angle to the axis of the arm 342, at the end of the arm 342. The tubular member 344 has an internal chamber 346, FIG. 8, communicating with a passageway 348 in the arm 342, controllably placed in communication with a source of suction, not shown, through a fitting 350 and a flexible conduit or hose 352. The tubular member 344 has an open end provided with an edge 354, FIG. 8, conforming to the shape of the shoulder 356 of the spark plug insulator body 180 such as to engage the shoulder 356, with the tip 358 of the spark plug insulator body 180 projecting within the chamber 346. A partially cylindrical hood 360 engages a portion of the peripheral surface of the body 180 when the tip 358 thereof is engaged within the chamber 346 as a result of linear displacement of the slide 236 for engaging the edge 354 of the tubular member 344 with the shoulder 356 of the insulator body 180. A rod 362 is axially mounted within the tubular member 344 and is provided at its free end with an enlarged head 364 covered with a cushion or pad of elastomeric material 366. In operation, the elastomeric pad 366 is applied against the end face of the insulator body tip 358 such as to form an effective seal for the longitudinal bore 368 in the spark plug insulator body 180, such longitudinal bore 368 being, as is well known, for the purpose of installing a central electrode and appropriate seals during manufacture of the spark plug. Consequently, when the chamber 346 is placed in communication through the passageway 348 in the arm 342 and the conduit 352 with a source of suction or vacuum, the elastomeric pad 366 on the end of the rod 362 acts as a convenient seal elastically adapted to slight variations of manufacturing tolerances of the spark plug insulator body 180, effectively sealing the chamber 346 from the ambient and permitting the insulator body 180 to be held in the position illustrated at FIG. 8, with the hood portion 360 helping in stabilizing the insulator body 180, during pivoting of the part pick-up head 340 from the horizontal position shown in the drawing for picking up the insulator body 180 from the part conveyor 32 to a substantially vertical position preparatory to placing the insulator body 180 in a sagger 28.

As previously mentioned, the parts 34, namely the green spark plug insulator bodies 180, are placed in the saggers 28 on the sagger conveyor 12 one at a time in consecutive rows, each in a vertical position. For that purpose, the saggers 28 contain a styrofoam insert or tray 370 provided with a plurality of part-holding cavities 372 for nesting the end of each spark plug insulator body 180 for holding each spark plug insulator cylindrical body in a vertical position in consecutive staggered rows, as best shown in FIGS. 3 and 11. The part-holding cavities 372 in the styrofoam insert 370 are cylindrical, equidistant from each other, and of a size adapted to snuggly accept the cylindrical end of each spark plug insulator body 180. Each styrofoam insert 370 fits in a sagger 28 with a narrow lateral clearance, as shown at 374 at FIG. 12, permitting to precisely locate the tray within the sagger 28. Each cavity 372 is tapered at its open end, as shown at 376, to facilitate introduction therein of the end of the insulator body 180.

A positioner 380, FIGS. 1-3 and 11-13 is mounted over the sagger conveyor 12, for the purpose of locating the styrofoam inserts 370 in the saggers 28, the saggers being laterally located on the belt 16 of the sagger conveyor 12, by one of their sidewalls in abutting engagement with a guiderail 382, FIG. 11. The positioner 380 comprises a frame having upright plate members 384 having a bracket portion 385 bolted to the side channels of the frame 22 of the sagger conveyor 12 and interjoined at their top by a cross-member or bridge 386. The cross-member or bridge 386 is in the form of a pair of symmetrically disposed L-shaped plates 388, laterally reinforced by triangularly shaped ribs or fillets 390, and having upwardly extending plates 392 braced by an integral interconnecting web 394. Two hydraulic or air cylinders 396 and 398, disposed parallel to each other, are affixed between the upwardly extending plates 392 to a support plate 400 bolted on the top of the upwardly extending plates 392, one cylinder extending substantially vertically on one side of the web 394 and the other on the other side of the web 394. A reciprocable ram 402 extends laterally between the frame lateral upright members plate 384. The ram 402 is formed of two lateral blocks 404 interconnected by a bracing cross-member 406 fastened, such as by welding, at each end to one of the lateral blocks 404. Each lateral block 404 is provided with a pair of appropriately bushed vertical parallel bores 408 through which are slidably disposed stationary support rods 410, such that the ram 402 is reciprocable substantially vertically, as supported and guided by two pairs of rods 410. The rods 410 are affixed at one end to the bridge member 386 and at their other end to the bracket portion 385 of the lateral frame upright members 384.

The air cylinder 396 has a piston rod 412 attached at its end, as shown at 414, to a lug 416 fastened to one side of the ram cross-member 406, as best shown in FIG. 13. The piston rod 418 of the second air cylinder 398 carries on its end an abutment block 420 engageable with an abutment plate 422 mounted on the top of a lug 424 fastened to the other side of the ram cross-member 406. The air cylinder 396 therefore operates the ram in reciprocating motion as a result of the reciprocation of its piston rod 412, the upward limit of the stroke of the ram 402 being defined by the adjustment of the abutment block 420 mounted on the end of the piston rod 418 of the cylinder 398 which, in the position shown at FIG. 13, corresponds to full extension of the piston rod 418. However, full upward retraction of the ram 402 may be effected, to the position shown at FIG. 12 in dashed line, by fully retracting the piston rods 412 and 418, such that upward stroke of the ram 402 is no longer limited by the engagement of the abutment plate 422 with the abutment block 420 mounted on the end of the piston rod 418.

A plate 426 and a bar 428 are mounted below the ram 402. The plate 426 is bolted on the bottom face of a pair of support blocks 430 which are in turn attached to a rod 432, extending from one ram lateral block 404 to the other, by means such as pins 433. One end of the rod 432 is connected to the piston rod 434 of an air cylinder 436 mounted substantially horizontally on the outside face of a lateral block 404 such that operation of the air cylinder reciprocates the rod 432. The rod 432 projects through the other lateral block 404, as shown at 438, and means are provided for limiting the permissible stroke of the rod 432 and rotation of the rod about its longitudinal axis. Such means may consist, for example and as illustrated at FIG. 12, of an end cap 440 bolted on the outer side surface of the other block 404, and provided with a bore 442 through which projects the end of the rod 432, the bore 442 being closed by an abutment plate 444 limiting the extreme displacement, to the left as seen in FIG. 12, of the end of the rod 432 under the action of the air cylinder 436. The rod 432 is prevented from rotating by, for example, a flat lateral surface 446 in sliding engagement with a square or rectangular key 448 transversely disposed through the bore 442 in the end cap 440 and having a face 450 in engagement with the rod flat surface 446.

As best shown at FIG. 13, each support block 430 has a rectangular cut-out portion 452 at its bottom end in which is slidably fitted the bar 428. A pair of compressed coil springs 454, one in each block 430, disposed in a vertical bore 456 in each block 430 urge the bar 428 in engagement with the top of the plate 426. A plurality of cylindrical probes 458 are mounted, in a single transverse row, below the plate 426. The probes 458 are spaced according to the spacing of the part holding cavities 372 in each row of cavities 372 in the styrofoam tray insert 370.

When the ram 402 is reciprocated downwardly by the air cylinder 396, the probes 458 are caused to penetrate at their end into the part-holding cavities 372 of a row in the styrofoam insert 370. In the event that the styrofoam insert 370 is not quite accurately located laterally and longitudinally in the sagger 28, the top of the probes 458 tends to slidably displace the insert 370 longitudinally and laterally within the sagger, through engagement with the tapered edge 376 of the part-holding cavities 372, to enable the probes 458 to penetrate approximately to the depth shown at FIG. 12. The diameter of the probes 458 is substantially less than the diameter of the cavities 372, and the respective dimensions of the clearance 374 between the sidewall of the insert 370 and the walls of the sagger 28 and the clearance resulting from the difference in diameter between the outside diameter of the probe tip and the diameter of the cavities 372 are such that the probes 458 are freely introduced into the cavities 372. A pair of abutment plates or stops 460, FIG. 12, are mounted extending laterally at a fixed position from the side members 384 to interfere with the downward motion of the bar 428 beyond a predetermined limit. During downward motion of the ram 402, and as soon as the ends of the bar 428 engages the stops 460, further progress of the bar 428 is prevented and the bar 428 separates from the plate 426, compressing the springs 454 in the support blocks 430. This causes expansion of the probes 458 at their tip, as shown schematically at FIGS. 14-17.

Figure 15:
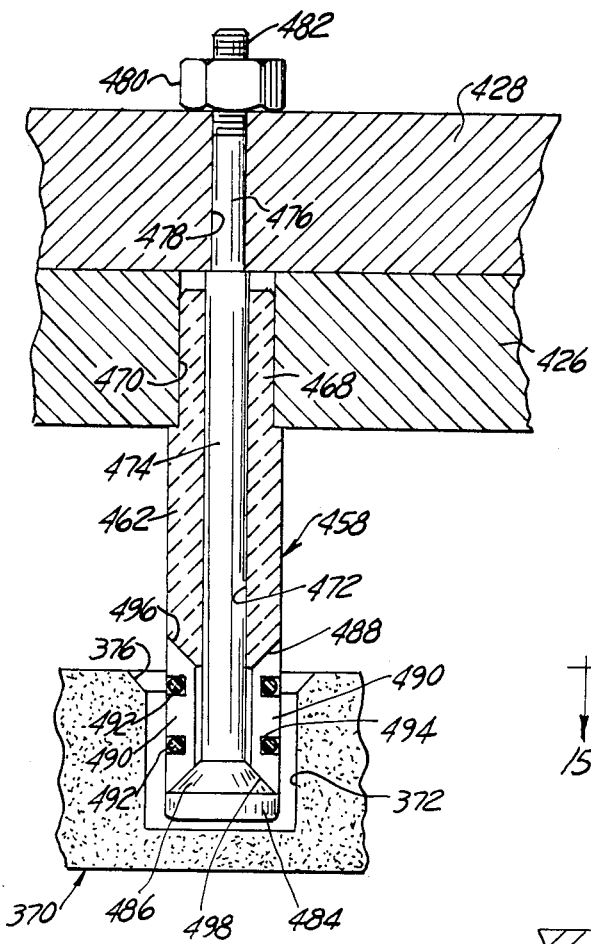
FIG. 15 is a sectional view along line 15—15 of FIG. 14.
Figure 14:
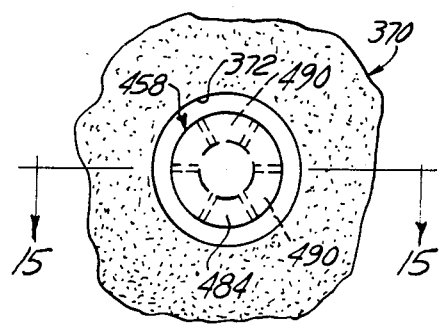
FIG. 14 is a partial sectional view of a portion thereof from line 14—14 of FIG. 12, and showing a cavity locator and sizing probe.
Figure 16:
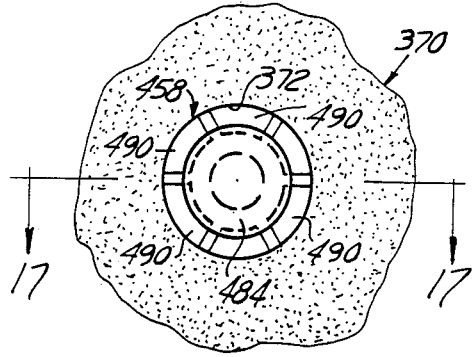
FIG. 16 is a view similar to FIG. 14 but showing the probe in an expanded state.
Figure 17:
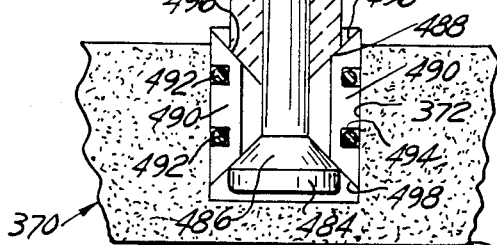
FIG. 17 is a view thereof from line 17—17 of FIG. 16.

Each probe 458 consists of, for example, a tubular member 462 having a reduced diameter portion 468 press-fitted in a bore 470 in the support plate 426, FIG. 15. The tubular member 462 has a longitudinal bore 472 in which is slidably disposed a rod 474 having a reduced diameter end portion 476 fitted in a bore 478 in the bar 428 and fastened by way of a nut 480 threading around the threaded end 482 of the rod 474. The rod 474 terminates, at its lower end, in an enlarged head 484 having a tapered upper face 486. The probe tubular body 462 also terminates in an annular face 488 having reverse taper. A plurality of cylindrical segments 490, for example six in number, FIG. 14, are held around the periphery of the rod 474 where it projects beyond the annular tapered face 488 of the probe tubular body 462 by means of a pair of annular garter springs or O-rings 492 disposed in a peripheral circular groove 494 in the segments 490. The end face of each segment 490 is tapered, as shown respectively at 496 and 498, the segment tapered end face 496 being engaged with the tapered annular face 488 of the probe tubular body 462 and the segment tapered end face 498 being engaged with the rod tapered face 486. When the plate 426 is displaced downwardly by the ram 402, FIGS. 11–13, the bar 428 on which is mounted the end of the rod 474 of the probe 458 is displaced relative to the plate 426, as a result of the ends of the bar 428 engaging the stops 460, FIG. 12, from the position shown at FIG. 15 to the position shown at FIG. 17. The rod 474 is retracted relative to the probe tubular body 462, with the result that the distance separating the tubular body annular tapered face 488 from a rod head tapered face 486 is decreased, thus causing the segments 490 to be displaced outwardly, as shown at FIG. 17. Extension of the segments 490 accomplishes the triple purpose of further locating the tray insert 370 in a proper predetermined position in the sagger 28, centering and locating the part-holding cavities 372 of the tray insert 370, and sizing the diameter of the cavities 372, as a result of the relatively pressure-crushable characteristics of the styrofoam material of which the tray inserts 370 are made.

FIGS. 19–21 illustrate a modification of the structure of the probes 458 wherein the lower portion of the probe tubular body 462 is longitudinally slit as shown at 500 such as to form a plurality, for example six in number, of elastically radially expandable segments 502. The segments 502 remain attached to the solid portion of the probe tubular body 462 by a resilient thin wall portion 504, and they are each provided with a tapered end surface 506 engaged with the tapered face 486 of the rod end 484, such that when the plate 426 and the bar 428 are displaced away from each other, FIG. 21, the tip of the segments 502 are caused to expand laterally, as a result of the camming action of the rod tapered head surface 486 upon the inwardly tapered surface 506 of the segments, causing the segments 502 to elastically be displaced radially and take a substantially cylindrical peripheral shape, FIGS. 20–21 from their original peripheral frusto-conical shape, FIGS. 18–19. The tray insert 370 is thus located, and the cavities 372 are indexed and appropriately sized.

The part-holding cavities 372 in consecutive rows in the tray insert 370 are staggered from one row to the next. After locating a first row of part-holding cavities 372 the probes 458 are extracted from the cavities 372 by the ram 402 being lifted by the cylinder 396 to the position causing engagement of the abutment block 420 on the end of the piston rod 418 of the cylinder 398, FIG. 13. At the beginning of the retraction step, the tip of the probes 458 contracts as a result of the space between the bar 428 and the plate 426 being progressively decreased under the influence of the springs 454 until the bar 428 and the plate 426 are again in mutual engagement. At the end of the upward motion of the ram 402, the abutment block 420 on the end of the extended piston rod 418 of the cylinder 398 engages the abutment plate 422 and limits the upward stroke of the ram 402 to that permitting the tip of the probe 458 to be free from the cavity 372. The sagger conveyor 12 advances the sagger 28 to index the next row of cavities 372 of the tray insert 370. As the next row of cavities is staggered relative to the first indexed row, the rod 432 to which are affixed the support blocks 430 of the probe support plate 426 is displaced laterally by the air cylinder 436, such that the probes 458 are now aligned with the part-holding cavities 372 of the next row. The indexing operation is repeated from row to row.

The operation of the apparatus is controlled according to a predetermined program timed such that the probes 458 remain in cavities in the styrofoam tray insert 370 during loading of parts 34 in the cavities in a row several rows downstream in the direction of travel of the saggers 28. The locating and indexing positioner 380 therefore conveniently holds the tray insert 370 in an indexed fixed position while the cavities 372 in the row are being loaded. After the cavities 372 of the last row in a tray insert 370 in a sagger 28 have been appropriately indexed and sized, the ram 402 is fully retracted by the cylinder 396, the cylinder 398 being simultaneously controlled such as to fully retract the abutment block 420, thus permitting the probes 458 to be fully clear of the edge of the sagger 28 in process of being loaded. The tray insert 370 in the sagger 28 in the process of being loaded is held in its indexed position relative to the sagger by the weight of the spark plug porcelain bodies 180 already loaded in several rows of holding cavities 372. Preferably, the distance separating the last row of part-holding cavities 372 in an insert 370 in the first sagger from the first row of cavities in the tray insert in the next sagger, corresponds to the distance that the preceding sagger has to be indexed by the sagger conveyor 12 in consecutive steps in finish loading that preceding sagger. When the following sagger is indexed by the sagger conveyor 12 with the first row of cavities 372 in its tray insert 370 approximately located below the probes 458, the operation is repeated for indexing and sizing consecutive rows of cavities. Loading of the cavities 372 with parts does not start until an appropriate number of rows of cavities have been appropriately indexed and sized by the probes 458, for example five or six rows of cavities.

To prevent lifting the tray insert 370 from the sagger 28 at the beginning of the retraction step of the probes 458 due to frictional interreaction between the cavity walls and the expanded segments at the end of each probe, appropriate pressure members may be provided as schematically illustrated in dotted lines at FIG. 12. Such pressure members may consist, for example, of a washer 510 affixed to the end of a coil spring 512 having its other end fastened below the plate 426. One such pressure member is mounted around some of the probes 458 so that the washer 510 applies a downwardly directed pressure upon the top surface of the tray insert 370 at the beginning of the retraction of the probes 458 from within the cavities 372.

The operation of the apparatus of the invention is automatic. Diverse sensors, in the form of pressure switches, limit switches, proximity switches and light beam activated photoelectric sensors are disposed at appropriate locations along the sagger conveyor 12, FIGS. 1–3, and the part conveyor 32, to regulate the flow of saggers 28 on the sagger conveyor belt 16, to regulate the flow of parts 34 on the part conveyor 32, and to coordinate the operation of the loader 46 to load the saggers 28 with parts 34 in an appropriate order.

The operation of the stepping motor 33 driving the part conveyor 32 is similarly subjected to the control of appropriate sensors detecting the presence of parts at diverse locations along the conveyor 32. For example, a sensor installed at the inlet of the part conveyor 32 detects the presence of parts being loaded on the conveyor. One or more jam detectors detects the presence or absence of parts at chosen locations along the part conveyor 32 and are arranged to either sound an alarm or stop the operation of the apparatus, or both, in the event of malfunction.

In arrangements where a single part 34, such as a spark plug insulator body 180, is loaded from the part conveyor 32 onto the sagger 28, a part presence sensor at the end of the part conveyor 32 actuates the beginning of the operation of the loader 46 and part pick-up unit 42. Knowing how many parts are to be placed in a row of the tray insert 370 in the sagger 28, for example as stored in the memory of a controlling unit 600, FIG. 3, the slide stepping motor 260 of the part loading unit 42 of FIGS. 5-7, is operated such as to locate the slide 236 and part pick-up head 288 along the slide ways to an appropriate position corresponding to the order of the single part being loaded in a row in the sagger tray insert 370. The slide stepping motor 260 may be operated under the control of a counter that counts each part being placed in a row in the sagger tray insert 370, under the control of the programmed controlling unit 600.

An appropriate sensor may be disposed at an appropriate location to determine the presence of a part 34 being actually picked up from the end of the part conveyor 32 and, as will be appreciated by those skilled in the art, other sensors may be disposed for counting the rows of parts being actually loaded in the sagger tray insert 370. When a full row of parts has been loaded in the tray insert, the sagger conveyor motor 24 is activated to advance the conveyor belt 16 of a distance corresponding to the distance separating consecutive rows. Alternatively, the whole function consisting of counting parts loaded in a row, indexing to the next row, indexing to the next sagger, etc., may be made under the control of an apropriate programmed electronic processor, incorporated in the controlling unit 600.

Having thus described the present invention by way of examples of structure well adapted to accomplish the purpose of the invention, modifications whereof will be apparent to those skilled in the art, what is claimed as new is as follows:

1. An apparatus for transferring parts comprising a first conveyor for carrying parts having an elongated body and travelling in a substantially horizontal position along a first axis of travel, a second conveyor having a receptacle thereon and travelling along a second axis of travel at an angle to said first axis of travel, said receptacle for carrying parts placed singly in a specific order in one of consecutive rows each of a predetermined plurality of said parts, a part pick-up unit, means supporting said part pick-up unit at a location where said first axis of travel and said second axis of travel intersect, means displacing said part pick-up unit from a predetermined first position relative to the end of said first conveyor to a predetermined second position above said second conveyor and returning said part pick-up unit to said first position, said part pick-up unit comprising a slide, support means for said slide, means linearly displacing said slide from a part pick-up position to a part-loading position, a part pick-up member rotatably mounted on said slide for holding said part during displacement of said part pick-up unit and of said slide from said part pick-up position to said part-loading position and means rotating said part pick-up member relative to said slide for rotating said part from said substantially horizontal position at said part pick-up position to a substantially vertical position at said part-loading position for loading said part in said receptacle on said second conveyor.

2. The apparatus of claim 1 further comprising means rotating said part pick-up member through an arc of approximately 270°.

3. The apparatus of claim 1 wherein said means rotating said part pick-up member relative to said slide rotates said part pick-up member through an arc of approximately 270° for rotating said part from said substantially horizontal position to said substantially vertical position.

4. The apparatus of claim 2 wherein said means rotating said part pick-up member comprises a rotary actuator mounted on said slide, said rotary actuator having an output shaft disposed substantially horizontally, and said part pick-up member is mounted on said output shaft.

5. The apparatus of claim 3 wherein said means rotating said part pick-up member comprises a rotary actuator mounted on said slide, said rotary actuator having an output shaft disposed substantially horizontally, and said part pick-up member is mounted on said output shaft.

6. The apparatus of claim 1 wherein said part pick-up member is disposed on a support member, said support member being mounted on the output member of a rotary actuator mounted on said slide.

7. The apparatus of claim 6 wherein said part pick-up member comprises a pair of fingers displaceable towards and away from each other for grasping said part therebetween, and means displacing said fingers.

8. The apparatus of claim 6 comprising a pair of fingers mounted from said support member pivotably relative one to the other, biasing means urging said pivotable fingers towards each other, and a reciprocable wedge member disposed between said fingers separating said fingers away from each other against the action of said biasing means and allowing said fingers to pivot towards each other under the action of said biasing means.

9. The apparatus of claim 4 adapted to pick up parts having a cylindrical body provided with a stepped peripheral portion, said part pick-up member comprising a tubular member, a chamber in said tubular member, and means placing said chamber controllably with a source of suction, wherein said tubular member has an end face adapted to engage said stepped peripheral portion of said cylindrical body.

10. The apparatus of claim 5 adapted to pick up parts having a cylindrical body provided with a stepped peripheral portion, said part pick-up member comprising a tubular member, a chamber in said tubular member, and means placing said chamber controllably with a source of suction, wherein said tubular member has an end face adapted to engage said stepped peripheral portion of said cylindrical body.

11. The apparatus of claim 4 adapted to pick up spark plug insulators having a cylindrical body provided with a stepped peripheral portion and a longitudinal bore, said part pick-up member comprising a tubular member, a chamber in said tubular member, and means placing said chamber controllably with a source of suction, wherein said tubular member has an end face adapted to engage said stepped peripheral portion of said cylindrical body, and further comprising an elastomeric cushion disposed in said chamber, and means supporting said elastomeric cushion in engagement with an end of said bore for preventing ambient air from flowing into said chamber when said chamber is placed in communication with a source of suction.

12. The apparatus of claim 5 adapted to pick up spark plug insulators having a cylindrical body provided with a stepped peripheral portion and a longitudinal bore, said part pick-up member comprising a tubular member, a chamber in said tubular member, and means placing said chamber controllably with a source of suction, wherein said tubular member has an end face adapted to engage said stepped peripheral portion of said cylindrical body, and further comprising an elastomeric cushion disposed in said chamber, and means supporting said elastomeric cushion in engagement with an end of said bore for preventing ambient air from flowing into said chamber when said chamber is placed in communication with a source of suction.

13. The apparatus of claim 9 further comprising a partially cylindrical hood extending over said cylindrical body beyond said stepped peripheral portion.

14. The apparatus of claim 10 further comprising a partially cylindrical hood extending over said cylindrical body beyond said stepped peripheral portion.

15. The apparatus of claim 11 further comprising a partially cylindrical hood extending over said cylindrical body beyond said stepped peripheral portion.

16. The apparatus of claim 12 further comprising a partially cylindrical hood extending over said cylindrical body beyond said stepped peripheral portion.

* * * * *

UNITED STATES PATENT AND TRADEMARK OFFICE
CERTIFICATE OF CORRECTION

PATENT NO. : 4,569,183

DATED : 2/11/86

INVENTOR(S) : Raymond P. DeSantis

It is certified that error appears in the above-identified patent and that said Letters Patent are hereby corrected as shown below:

Col. 8, line 39, change "top" to --tip--.

Signed and Sealed this

Tenth Day of June 1986

[SEAL]

Attest:

DONALD J. QUIGG

Attesting Officer

Commissioner of Patents and Trademarks